United States Patent [19]

Matsudaira et al.

[11] Patent Number: 4,765,715
[45] Date of Patent: Aug. 23, 1988

[54] BEAM SPLITTER HAVING A PARTIAL SEMITRANSPARENT LAYER ASSIGNED TO A PLURALITY OF OUTGOING LIGHT BEAMS

[75] Inventors: Takeo Matsudaira; Teiji Inoue, both of Tokyo, Japan

[73] Assignee: Hoya Corporation, Tokyo, Japan

[21] Appl. No.: 69,659

[22] Filed: Jul. 6, 1987

Related U.S. Application Data

[63] Continuation of Ser. No. 630,591, Jul. 13, 1984, abandoned.

[30] Foreign Application Priority Data

Jul. 13, 1983 [JP] Japan .................................. 58-127151

[51] Int. Cl.$^4$ ............................................. G02B 27/14
[52] U.S. Cl. ...................................... 350/171; 350/169
[58] Field of Search ............... 350/169, 171, 174, 286; 358/298

[56] References Cited

U.S. PATENT DOCUMENTS

| | | | |
|---|---|---|---|
| 3,485,552 | 12/1969 | Adler | 350/169 |
| 3,498,693 | 3/1970 | Fein et al. | 350/169 |
| 4,125,864 | 11/1978 | Aughton | 350/286 |
| 4,362,361 | 12/1982 | Campbell et al. | 350/171 |

Primary Examiner—John K. Corbin
Assistant Examiner—Paul Dzierzynski
Attorney, Agent, or Firm—Roberts, Spiecens & Cohen

[57] ABSTRACT

In a beam splitter for splitting a single input light beam into a plurality of outgoing light beams, a transparent block has first and second planar surfaces substantially parallel to each other. Antireflection and reflection layers are laid on incident and reflection areas defined on the first planar surface while a plurality of partial semitransparent layers are attached to an outgoing area defined on the second planar surface. The incident light beam enters through the antireflection layer into the block and exits as the outgoing light beams through the partial semitransparent layers. At least one of the partial semitransparent layers has a width wide enough to at least two of the outgoing light beams. The partial semitransparent layers may be deposited on the first planar surface in the vicinity of the antireflection layer. In this event, the reflection layer is deposited on the second planar surface.

11 Claims, 3 Drawing Sheets 4,765,715

BEAM SPLITTER HAVING A PARTIAL SEMITRANSPARENT LAYER ASSIGNED TO A PLURALITY OF OUTGOING LIGHT BEAMS

This is a continuation of application Ser. No. 630,591, filed July 13, 1984, now abandoned.

BACKGROUND OF THE INVENTION

This invention relates to a beam splitter for use in splitting a single incident light beam into a plurality of outgoing light beams substantially parallel to one another.

In U.S. Pat. No. 4,125,864 issued to John E. Aughton, a beam splitter is disclosed which splits a single incident light beams into a plurality of outgoing light beams substantially parallel to one another. As will later be described in conjunction with one of the accompanying figures of the drawing, the beam splitter comprises a transparent substrate or block having a pair of parallel planes, an antireflection layer at an incident portion defined on one of the planes, a reflection layer laterally adjacent to the antireflection layer on the one plane, and a semitransparent layer divided into a plurality of partial semitransparent layers at outgoing portions defined on the other plane. With this beam splitter, each of the outgoing light beams should exit through each of the partial semitransparent layers predetermined for each outgoing light beam. Stated otherwise, the partial semitransparent layers are in one-to-one correspondence to the outgoing light beams. Therefore, the partial semitransparent layers must exactly be positioned or registered on the outgoing portions of the other plane. Inasmuch as a very small distance is required between two adjacent ones of the outgoing light beams, it is difficult to precisely register the partial semitransparent layers in place.

Herein, it is to be noted here that each of the partial semitransparent layers should have a reflectance different from one another so as to keep the luminous energy of each outgoing light beam at a desired value. Each partial semitransparent layer is manufactured by stacking a plurality of dielectric films on one another. The number of the dielectric films must be varied at every outgoing portion in order to provide each reflectance different from one another. It is very troublesome to deposit the above-mentioned partial semitransparent layers on the respective outgoing portions. A reduction of a yield inescapably takes place in manufacturing the beam splitter because of such a troublesome process.

SUMMARY OF THE INVENTION

It is an object of this invention to provide a beam splitter which is inexpensive.

It is another object of this invention to provide a beam splitter of the type described, which can readily be manufactured.

It is a further object of this invention to provide a beam splitter of the type described, which can improve the yield.

According to this invention, a beam splitter is provided which splits a single incident light beam into a plurality of outgoing light beams substantially parallel to one another. The beam splitter comprises a transparent block having a first planar surface and a second planar surface substantially parallel to said first planar surface. A preselected one of the first and the second planar surfaces has an outgoing area covered with a semitransparent layer through which the outgoing light beams exit transversely of the preselected planar surface while the remaining surface has a reflection area covered with a reflection layer. Either of the preselected and the remaining planar surfaces defines an incident area for receiving the incident light beam. The semitransparent layer comprises a plurality of partial semitransparent layers which are arranged in a predetermined direction side by side and which have reflectances different from one another. At least one of the partial semitransparent layers has a prescribed width wide enough along the preselected one of the first and the second planar surfaces to emit at least two of the outgoing light beams.

DESCRIPTION OF THE PREFERRED EMBODIMENTS

Figure 1:
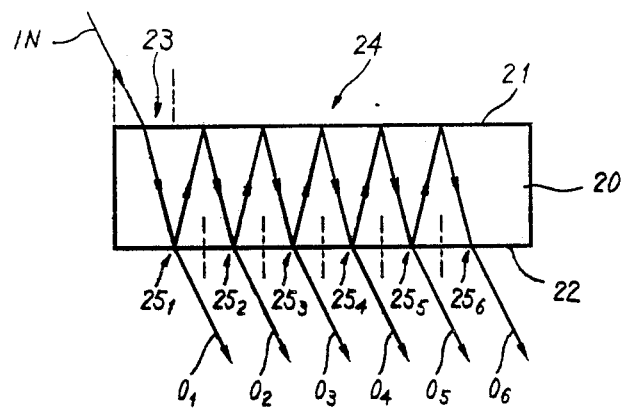
FIG. 1 is a schematic view for use in describing a conventional beam splitter.

Referring to FIG. 1, a conventional beam splitter will first be described for a better understanding of this invention. The illustrated beam splitter is substantially equivalent to that disclosed in the Aughton U.S. Pat. No. 4,125,864 and comprises a transparent block 20 having a first planar surface 21 and a second planar surface 22 substantially parallel to the first planar surface 21. In the example being illustrated, the first planar surface 21 defines incident and reflection areas, namely, portions 23 and 24 while the second planar surface 22 has a predetermined number of outgoing areas. The predetermined number is equal, for example, to six, as shown at $25_1$ to $25_6$ in FIG. 1. The incident and the reflection areas 23 and 24 are covered with an antireflection layer (not shown in FIG. 1) and a reflection layer (not shown also), respectively. On the other hand, the outgoing areas $25_1$ to $25_6$ are covered with a semitransparent layer (not shown) divided into first through sixth partial semitransparent layers, respectively. The first through the sixth partial semitransparent layers have different reflectances.

An incident light beam In is directed into the block 20 at the incident area 23. The incident light beam IN travels to the outgoing area $25_1$ and partially exits as a first outgoing light beam $O_1$ through the first partial semitransparent layer. The remaining portion of the incident light beam is internally reflected by the first semitransparent layer towards the reflection area 24 to be internally reflected by the reflection layer. An internally reflected light beam comes back from the reflection layer to the second partial transparent layer attached to the outgoing area $25_2$. As a result, the internally reflected light beam is partially emitted as a second outgoing light beam $O_2$ and is partially internally reflected towards the reflection area 24. Internal reflection and partial transmission are repeated in the block 20 to produce third through sixth outgoing light beams $O_3$ to $O_6$.

Thus, the illustrated beam splitter splits the incident light beam IN into the first through the sixth outgoing light beams $O_1$ to $O_6$ which are substantially parallel to one another. At any rate, the first through the sixth partial semitransparent layers should be in one-to-one correspondence to the first through the sixth outgoing light beams $O_1$ to $O_6$ and should severely be controlled in reflectance so that they have desired luminous energy. Accordingly, the beam splitter has shortcomings as pointed out in the background section of the instant specification.

Figure 2:
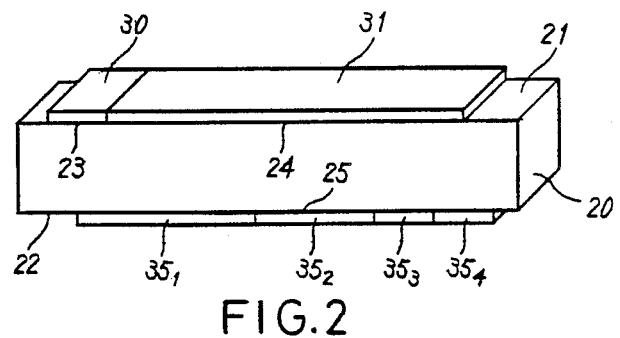
FIG. 2 is a perspective view of a beam splitter according to a first embodiment of this invention.
Figure 3:
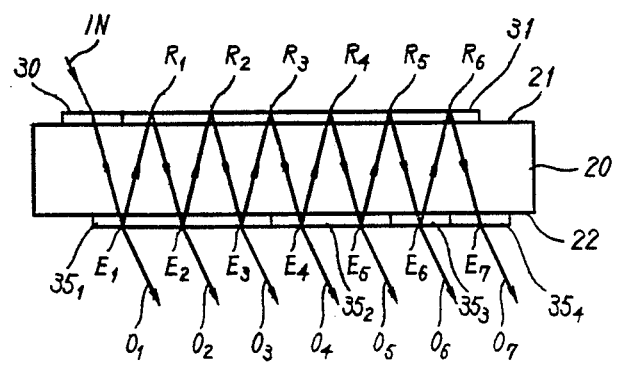
FIG. 3 is a view for use in describing operation of the beam splitter illustrated in FIG. 2.
Figure 4:
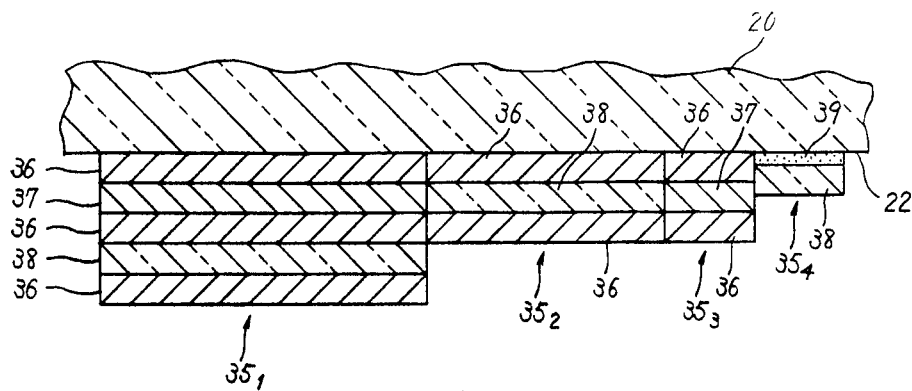
FIG. 4 is a partial enlarged sectional view of the beam splitter illustrated in FIG. 2.

Referring to FIGS. 2 through 4, a beam splitter according to a first embodiment of this invention comprises similar parts and light beams designated by like reference numerals and symbols. The transparent block or substrate 20 has the first and the second planar surfaces 21 and 22, as shown in FIG. 2. The transparent glass block 20 is 12 mm long, 3 mm wide, and 3 mm thick and may be of BSC7 manufactured and sold by Hoya Corporation. As in FIG. 1, the first planar surface 22 defines incident and reflection areas 23 and 24. The incident area 23 is coated with an antireflection layer 30 while the reflection area 24 is covered with a reflection layer 31 contiguous to the antireflection layer 30. Thus, the antireflection and the reflection layers 30 and 31 are laterally arranged in parallel.

The antireflection layer 30 is formed by depositing a couple of dielectric films both of which are of magnesium fluoride ($MgF_2$) and zirconium dioxide ($ZrO_2$), respectively. On the other hand, the reflection layer 31 consists of a stack of twenty-one films which are formed by alternate superposition of titanium dioxide ($TiO_2$) and silicon dioxide ($SiO_2$). The illustrated reflection layer 31 includes first through sixth reflection points $R_1$ to $R_6$ for internal reflections.

The illustrated second planar surface 21 defines first through seventh outgoing areas through which first through seventh outgoing light beams $O_1$ to $O_7$ exit, respectively, as shown in FIG. 3.

It should be noted here that the first through the seventh outgoing light beams $O_1$ to $O_7$ exit through first through fourth partial semitransparent layers $35_1$ to $35_4$ which are less in number than the outgoing light beams $O_1$ to $O_7$. More specifically, the first through the third outgoing areas are covered with the first partial semitransparent layer $35_1$ through which the first through the third outgoing light beams $O_1$ to $O_3$ exit, as illustrated in FIG. 3. In other words, the first partial semitransparent layer $35_1$ defines first through third exit points $E_1$ to $E_3$.

The fourth and the fifth outgoing areas are covered with the second partial semitransparent layer $35_2$ for providing the fourth and the fifth outgoing light beams $O_4$ and $O_5$. As a result, the second partial semitransparent layer $35_2$ defines fourth and fifth exit points $E_4$ and $E_5$. Likewise, the sixth and the seventh outgoing areas are covered with the third and the fourth semitransparent layers $35_3$ and $35_4$ for providing the sixth and the seventh outgoing light beams $O_6$ and $O_7$ through sixth and seventh exit points $E_6$ and $E_7$, respectively.

In FIG. 4, the first through the fourth partial semitransparent layers $35_1$ to $35_4$ are arranged in a predetermined direction, namely, a longitudinal direction of the block 20 side by side with no gap left therebetween. Therefore, two adjacent ones of the first through the fourth partial semitransparent layers $35_1$ to $35_4$ are brought into contact with each other at both side edges. Each partial semitransparent layer $35_1$ to $35_4$ has a width along the predetermined direction. Each of the first and the second partial semitransparent layers $35_1$ and $35_2$ has a width wide enough along the predetermined direction to emit at least two of the outgoing light beams.

In the example being illustrated, the first through the fourth partial semitransparent layers $35_1$ to $35_4$ are formed by stacking dielectric materials selected from a group consisting of titanium dioxide ($TiO_2$), silicon dioxide ($SiO_2$), magnesium fluoride ($MgF_2$), and zirconium dioxide ($ZrO_2$), these films of which will be called first-kind, second-kind, third-kind, and fourth-kind films, respectively. The first-kind through the fourth-kind films are indicated at 36, 37, 38, and 39 in FIG. 4, respectively.

More particularly, the first partial semitransparent layer $35_1$ is formed by successively depositing the first-kind film 36 of titanium dioxide, the second-kind film 37 of silicon dioxide, the first-kind film 36, the third-kind film 38 of magnesium fluoride, and the first-kind film 36. Each of the films in the first partial semitransparent layer $35_1$ has an optical thickness of $\lambda/4$, where $\lambda$ is representative of a wavelength of the incident light beam IN.

Similarly, the second partial semitransparent layer $35_2$ is formed by stacking the first-kind film 36, the third-kind film 38, and the first-kind film 36 in order while the third partial semitransparent layer $35_3$ is formed by successively stacking the first-kind film 36, the second-kind film 37, and the first-kind film 36 in order. Each film in the second and the third partial semitransparent layers $35_2$ and $35_3$ has an optical thickness of $\lambda/4$, as in the first partial semitransparent layer $35_1$.

The fourth partial semitransparent layer $35_4$ consists of the fourth-kind film 39 of zirconium dioxide and the third-kind film 38 both of which are successively formed on the second planar surface 22 and which have optical thicknesses equal to $(3/40)\cdot\lambda$ and $(13/40)\cdot\lambda$ respectively.

Each film in the first through the fourth partial transparent layers $35_1$ to $35_4$ is uniformly deposited by the use of vacuum evaporation.

In FIG. 3, the incident light beam IN enters the block 20 through the antireflection layer 30 and reaches the first partial semitransparent layer $35_1$ as an incoming light beam. The first partial semitransparent layer $35_1$ allows the incoming light beam to partially exit as the first outgoing light beam $O_1$ through the first exit point $E_1$ and partially internally reflects the incoming light beam towards the reflection layer 31. Total reflection takes place at the first reflection point $R_1$ of the reflection layer 31. The resultant light beam comes back to the second exit point $E_2$ of the first partial semitransparent layer $35_1$ so as to partially exit as the second outgoing light beam $O_2$ through the second exit point $E_2$. Partial reflection also occurs in the first partial semitransparent layer $35_1$ to internally reflect the remaining light beam towards the reflection layer 31. Similar operation is reiterated at the third through the sixth exit points $E_3$ to $E_6$ and at the second through the sixth reflection points $R_2$ to $R_6$. Finally, a remaining light beam exits through the seventh exit point $E_7$ as the seventh outgoing light beam $O_7$. Thus, iteration of total reflection and partial reflection accompanied by partial exit brings about the first through the seventh outgoing light beams $O_1$ to $O_7$.

Thus, the illustrated beam splitter splits the single incident light beam IN into the outgoing light beams $O_1$ to $O_7$. Therefore, the outgoing light beams $O_1$ to $O_7$ may be referred to as split beams. Let the single incident light beam IN be split into the split beams, M, in number. In addition, let luminous energy, namely, intensity of the incident light beam IN be represented by I. Under the circumstances, it is preferable that each outgoing light beam has an intensity equal to I/M which will be called an ideal value.

With the beam splitter illustrated with reference to FIGS. 2 to 4, a variation of the intensity inevitably takes place in the split beams. According to the inventor's experimental studies, it has been found that the intensity of each split beam may practically be reduced to 50% relative to the ideal value. There is no problem even when the intensity increases relative to the ideal value because such an increase of the intensity can be reduced by the use of an optical system.

As to the illustrated beam splitter, the ideal value of each outgoing light beam intensity is equal to 0.143 I because the number of the outgoing light beams is equal to seven. Table 1 gives an example of transmittance of the first through the fourth partial semitransparent layers $35_1$ to $35_4$ and intensity of the first through the seventh outgoing light beams $O_1$ to $O_7$.

TABLE 1

| Semi-transparent layers | Transmittance(%) | Outgoing Light Beams | Intensity of Beams |
|---|---|---|---|
| $35_1$ | 18 | $O_1$ | 0.180I |
|  |  | $O_2$ | 0.148I |
|  |  | $O_3$ | 0.121I |
| $35_2$ | 33 | $O_4$ | 0.182I |
|  |  | $O_5$ | 0.122I |
| $35_3$ | 50 | $O_6$ | 0.124I |
| $35_4$ | 100 | $O_7$ | 0.124I |

In Table 1, the third outgoing light beam $O_3$ has a minimum value of 0.121 I which is about 84% of the ideal value. Therefore, the illustrated beam splitter can be put into practical use.

Herein, it is to be noted here that the first through the seventh outgoing light beams $O_1$ to $O_7$ exit in sequence through the first through the fourth partial semitransparent layers $35_1$ to $35_4$, as readily understood from FIG. 3. As regards two adjacent ones of the partial semitransparent layers, it is possible to define preceding and succeeding partial semitransparent layers. In Table 1, let consideration be directed to two adjacent ones of the outgoing light beams, such as $O_3$ and $O_4$; $O_5$ and $O_6$, emitted from the two adjacent layers. As in the partial semitransparent layers, preceding and succeeding outgoing light beams can be defined as regards the two adjacent outgoing light beams, also. It is readily understood from Table 1 that the preceding outgoing light beam $O_3$ (or $O_5$) has an intensity lower than the succeeding outgoing light beam $O_4$ (or $O_6$). Thus, a leading one of the outgoing light beams that is emitted from a succeeding one of the semitransparent layers is higher in intensity than a trailing outgoing light beam that is emitted from a preceding one of the semitransparent layers. When the succeeding partial semitransparent layer allows at least two outgoing light beams to pass therethrough.

Each of the partial semitransparent layers $35_1$ to $35_4$ is deposited by vacuum evaporation method with metal masks precisely positioned in place on the second planar surface 22. Usually, it is necessary to provide a margin of metal mask registration of ±0.1 mm at every evaporation. In other words, precision in registration is dependent on the number of evaporations in manufacturing a beam splitter. As regards the beam splitter illustrated in FIGS. 2 to 4, the margin of registration may be ±0.4 mm because only four metal masks are used. On the other hand, the margin of ±0.7 mm is necessary in order to split a single incident light beam into seven outgoing light beams in a conventional manner described with reference to FIG. 1.

Thus, each of the first through the fourth partial semitransparent layers is formed in place with a high precision. This means that each outgoing light beam scarcely crosses a border between two adjacent layers and is not objectionably deformed in configuration.

Figure 5:
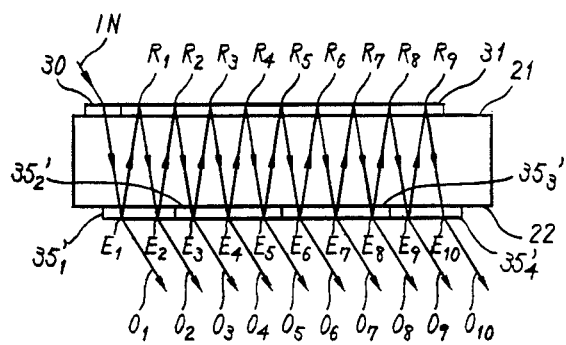
FIG. 5 is a view for use in describing operation of a beam splitter according to a second embodiment of this invention.
Figure 6:
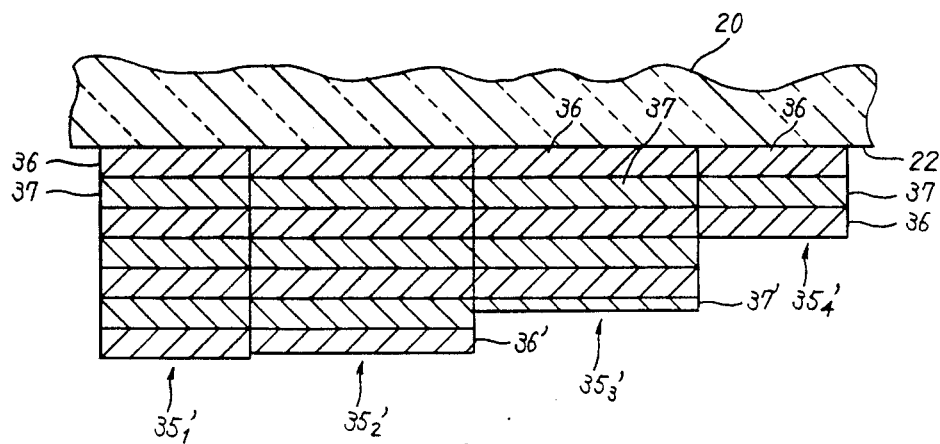
FIG. 6 is a partial enlarged sectional view of the beam splitter illustrated in FIG. 5.

Referring to FIGS. 5 and 6, a beam splitter according to a second embodiment of this invention is similar to that illustrated in FIGS. 2 to 4 except that first through tenth outgoing light beams $O_1$ to $O_{10}$ exit through a semitransparent layer divided into first through fourth partial semitransparent layers $35_1'$ to $35_4'$ in a manner different from that illustrated in FIGS. 2 to 4 and that each semitransparent layer is different in structure from that illustrated in FIGS. 2 to 4. In this connection, first through ninth reflection points $R_1$ to $R_9$ are defined in the reflection layer 31 and first through tenth exit points are defined in the semitransparent layer. As shown in FIG. 5, the first and the second exit points $E_1$ and $E_2$; the third through the fifth exit points $E_3$ to $E_5$; the sixth through the eighth exit points $E_6$ to $E_8$; and the ninth and the tenth exit points $E_9$ and $E_{10}$ are assigned to the first, the second, the third, and the fourth partial semitransparent layers $35_1'$, $35_2'$, $35_3'$, and $35_4'$, respectively.

In FIG. 6, the first partial semitransparent layer $35_1'$ consists of seven films formed by alternatingly and successively stacking titanium dioxide films and silicon dioxide films both of which may be called first-kind and second-kind films 36 and 37, respectively, as mentioned in conjunction with FIG. 4. As a result, the first partial semitransparent layer $35_1'$ comprises four of the first-kind films 36 and three of the second-kind films 37. Each film has an optical thickness of $\lambda/4$.

The second partial semitransparent layer $35_2'$ comprises six films similarly deposited by alternatingly stacking the first-kind and the second-kind films 36 and 37. Each of the six films has an optical thickness of $\lambda/4$. In addition, an additional titanium dioxide film $36'$ of $(8/40)\cdot\lambda$ is deposited as an overlayer. Thus, the second partial semitransparent layer $35_2'$ consists of four of the titanium dioxide layers and three of the silicon dioxide layers.

Likewise, three of the first-kind films, namely, the titanium dioxide films 36 are deposited as the third partial semitransparent layer $35_3'$ with two of the silicon dioxide films 37 interposed as the second-kind films between two of the first films 36. An additional silicon dioxide films $37'$ is coated on the outermost first-kind film 36 and has an optical thickness of $(3/40)\cdot\lambda$.

The fourth partial semitransparent layer $35_4'$ consists of three films formed by stacking the titanium dioxide film 36, the silicon dioxide film 37, and the titanium dioxide film 36 in order. Thus, the fourth partial semitransparent layer $35_4'$ consists of two of the first-kind films 36 and one of the second-kind film 37 between the first-kind film 36. Each film in the fourth partial semitransparent layer $35_4'$ has an optical thickness of $\lambda/4$. Table 2 gives an example of transmittance of the first through the fourth partial semitransparent layers $35_1'$ to $35_4'$ and intensity of the first through the tenth outgoing light beams $O_1$ to $O_{10}$.

TABLE 2

| Semi-transparent Layers | Transmittance(%) | Outgoing Light Beams | Intensity of Beams |
|---|---|---|---|
| $35_1'$ | 8 | $O_1$ | 0.180I |
|  |  | $O_2$ | 0.074I |
| $35_2'$ | 11 | $O_3$ | 0.093I |
|  |  | $O_4$ | 0.083I |
|  |  | $O_5$ | 0.074I |
| $35_3'$ | 20 | $O_6$ | 0.119I |
|  |  | $O_7$ | 0.095I |
|  |  | $O_8$ | 0.076I |
| $35_4'$ | 50 | $O_9$ | 0.153I |
|  |  | $O_{10}$ | 0.076I |

When the number of the outgoing light beams is equal to ten, the ideal value of each outgoing light beam is 0.1 I. The intensity of each outgoing light beam must be more than 50% of the ideal value as a minimum. For this purpose, a beginning one of the outgoing light beams to be emitted from each of the second through the fourth partial semitransparent layers $35_2'$ to $35_4'$ has an intensity higher than each outgoing light beam emitted immediately before the beginning outgoing light beam, as shown in Table 2. Specifically, the minimum intensity is kept at 74% of the ideal value in the beam splitter illustrated with reference to FIGS. 5 and 6 and gives rise to no problem in practical use.

Figure 7:
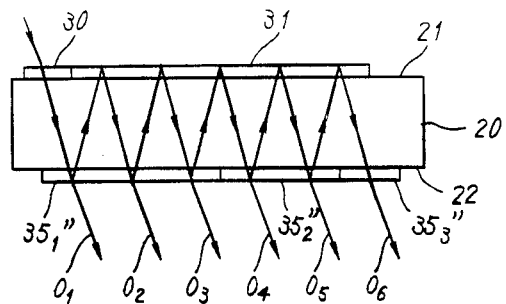
FIG. 7 is a view for use in describing operation of a beam splitter according to a third embodiment of this invention.
Figure 8:
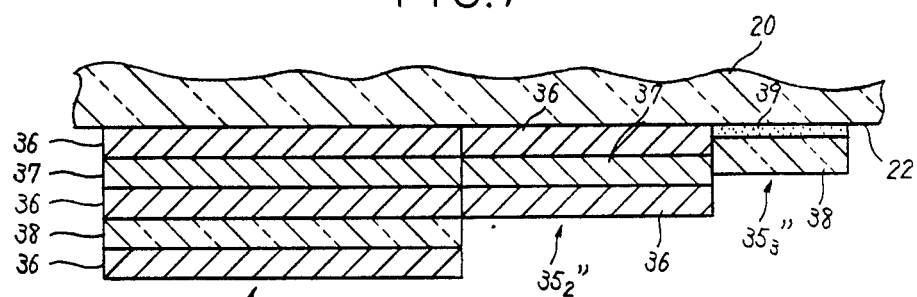
FIG. 8 is a partial enlarged sectional view of the beam splitter illustrated in FIG. 7.

Referring to FIGS. 7 and 8, a beam splitter according to a third embodiment of this invention is similar to that illustrated in FIGS. 5 and 6 except that first through third partial semitransparent layers $35_1''$ to $35_3''$ are attached to the second planar surface 22 and six outgoing light beams exit through the first through the third partial semitransparent layers $35_1''$ to $35_3''$. The six outgoing light beams will be called first through sixth outgoing light beams indicated at $O_1$ to $O_6$, respectively. As shown in FIG. 7, the first through the third outgoing light beams $O_1$ to $O_3$ appear through the first partial semitransparent layer $35_1''$ while the fourth and the fifth outgoing light beams $O_4$ and $O_5$ appear through the second partial semitransparent layer $35_2''$. The remaining sixth outgoing light beam $O_6$ exits through the third partial semitransparent layer $35_3''$.

In FIG. 8, each partial semitransparent layer $35_1''$ to $35_3''$ is formed by a plurality of films selected from a group of the first-kind through the fourth-kind films which are of titanium dioxide, silicon dioxide, magnesium fluoride, and zirconium dioxide, respectively, and which are indicated at 36, 37, 38, and 39, respectively, as mentioned before. More specifically, the first partial semitransparent layer $35_1''$ is formed by five films consisting of the first-kind, the second-kind, the first-kind, the third-kind, and the first-kind films 36, 37, 36, 38, and 36 which are stacked in order. Each film of the layer $35_1''$ has an optical thickness of $\lambda/4$. Similarly, the second partial semitransparent film $35_2''$ is formed by successively stacking the first-kind, the second-kind, and the first-kind films 36, 37, and 36 in order. Each film also has an optical thickness of $\lambda/4$. The third partial semitransparent layer $35_3''$ consists of the fourth-kind film 39 of $(3/40)\cdot\lambda$ and the third-kind film 38 of $(13/40)\cdot\lambda$. Table 3 exemplifies transmittance of the first through the third partial semitransparent layers $35_1''$ to $35_3''$ and intensity of each outgoing light beam.

TABLE 3

| Semi-transparent Layers | Transmittance(%) | Outgoing Light Beams | Intensity of Beams |
|---|---|---|---|
| $35_1''$ | 20 | $O_1$ | 0.20I |
|  |  | $O_2$ | 0.16I |
|  |  | $O_3$ | 0.128I |
| $35_2''$ | 50 | $O_4$ | 0.256I |
|  |  | $O_5$ | 0.128I |
| $35_3''$ | 100 | $O_6$ | 0.128I |

In the example being illustrated, the ideal value of intensity of each outgoing light beam is about 0.167 I because the incident light beam IN is split into six outgoing light beams $O_1$ to $O_6$. From Table 3, it is seen that the minimum intensity is kept at 77% of the ideal value.

Figure 9:
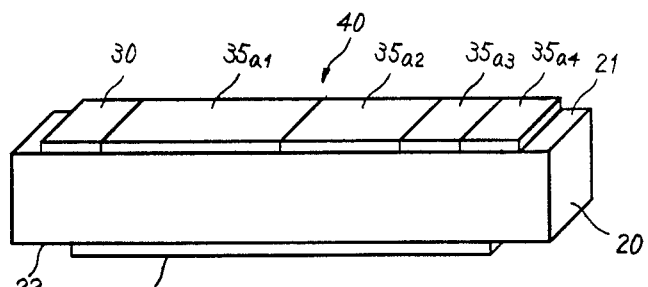
FIG. 9 is a perspective view of a beam splitter according to a fourth embodiment of this invention.
Figure 10:
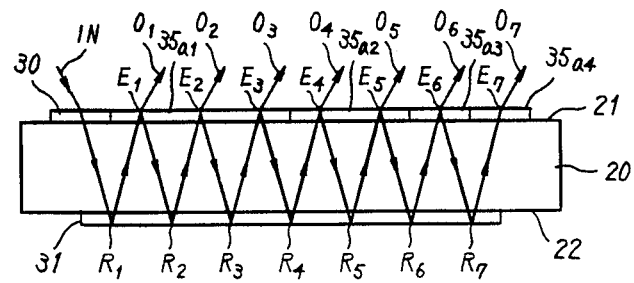
FIG. 10 is a view for use in operation of the beam splitter illustrated in FIG. 9.

Referring to FIGS. 9 and 10, a beam splitter according to a fourth embodiment of this invention comprises similar parts designated by like reference numerals and symbols. It is to be noted here that a semitransparent layer indicated at 40 is laid on the first planar surface 21 together with the antireflection layer 30 while the reflection layer 31 is laid on the second planar surface 22. As shown in FIG. 9, the semitransparent layer 40 is adjacent to the antireflection layer 30 and is divided into first through fourth partial semitransparent layers $35_{a1}$ to $35_{a4}$. As shown in FIG. 10, first through third outgoing light beams $O_1$ to $O_3$ exit through first through third exit points $E_1$ to $E_3$ of the first partial semitransparent layer $35_{a1}$ while fourth and fifth outgoing light beams $O_4$ and $O_5$ exit through fourth and fifth exit points $E_4$ and $E_5$ of the second partial semitransparent layer $35_{a2}$. In addition, sixth and seventh outgoing light beams $O_6$ and $O_7$ are emitted through sixth and seventh exit points $E_6$ and $E_7$ of the third and the fourth partial semitransparent layers $35_{a3}$ and $35_{a4}$, respectively. On the other hand, the reflection layer 31 has first through sixth reflection points $R_1$ to $R_6$. The first through the fourth partial semitransparent layers $35_{a1}$ to $35_{a4}$ are similar in structure and optical thickness to those illustrated with reference to FIGS. 2 and 4. Therefore, description will not be made about these semitransparent layers $35_{a1}$ to $35_{a4}$ any longer.

At any rate, it is possible for the illustrated beam splitter to split the incident light beam IN into the first through the seventh outgoing light beams $O_1$ to $O_7$ having intensity values as enumerated in Table 1.

In the above-description, the concept of the terms "transparent," "semitransparent," and "reflection" should be related to a wavelength of the incident light beam IN.

While this invention has thus far been described in conjunction with some embodiments thereof, it will readily be possible for those skilled in the art to put this invention into practice in various other manners. For example, all of the split light beams do not always exit through the semitransparent layers but a part of the split light beams may be cut by the use of a light absorption layer. Such a light absorption layer may be substituted, for example, for the fourth partial semitransparent layer 35₃ (FIGS. 2 to 4). The transparent block 20 may be of glass, plastics, or the like. Each film may be of a dielectric material selected from a group of cerium fluoride, aluminum oxide, yttrium oxide, tantalum oxide, hafnium oxide, cerium oxide, or the like. The number of the films to be stacked may be selected in accordance with the desired intensity of each outgoing light beam. The partial semitransparent layers may be disposed with a space left between two adjacent layers, if each exit point is defined in the semitransparent layers.

What is claimed is:

1. A beam splitter for use in splitting a single incident light beam into a plurality of outgoing light beams, said beam splitter comprising a transparent block having a first planar surface and a second planar surface which is substantially parallel to said first planar surface, a preselected one of said first and said second planar surfaces having an outgoing area covered with a semitransparent layer through which said outgoing light beams exit transversely of said preselected planar surface while the other planar surface has a reflection area covered with a reflection layer, either of said preselected and said other planar surfaces defining an incident area for receiving said incident light beam, said semi-transparent layer being divided into a plurality of adjacent partial semitransparent layers including:

a first partial semitransparent layer deposited on a first partial area of said preselected planar surface which is adjacent to said incident area, said first partial semitransparent layer serving for emitting one of said outgoing light beams as a preceding outgoing light beam which precedes outgoing light beams from a subsequent partial semitransparent layer;

a second partial semitransparent layer deposited on a second partial area of said preselected planar surface which is adjacent to said first partial area and which is farther from said incident area than said first partial area, said second partial semitransparent layer having a sufficient width along said preselected planar surface to emit a plurality of said outgoing light beams including one nearest to said preceding outgoing light beam, said one outgoing light beam which is emitted from said second partial semitransparent layer being the first of said plurality of outgoing light beams, said first and second partial semitransparent layers being such that said first outgoing light beam emitted from said second planar surface is higher in intensity than said preceding outgoing light beam emitted from said first planar surface.

2. A beam splitter as claimed in claim 1, wherein said first planar surface defines said incident and said reflection areas while said second planar surface defines said outgoing area.

3. A beam splitter as claimed in claim 1, wherein said first planar surface defines said incident and said outgoing areas while said second planar surface defines said reflection area.

4. A beam splitter as claimed in claim 1, wherein the intensity of said first of said outgoing light beams is greater than 50% of an ideal intensity of each said outgoing light beam calculated by dividing the incident light beam by the total number of the outgoing light beams emitted from said preselected planar surface.

5. A beam splitter as claimed in claim 1, wherein each of said partial semitransparent layers consists of a plurality of films of dielectric materials.

6. A beam splitter as claimed in claim 1, wherein each of said dielectric materials is selected from the group consisting of titanium dioxide, silicon dioxide, magnesium fluoride, zirconium dioxide, cerium fluoride, aluminum oxide, yttrium oxide, tantalum oxide, hafnium oxide, and cerium oxide.

7. A beam splitter as claimed in claim 1 wherein because a plurality of outgoing light beams are emitted from said second partial semitransparent layer, the number of partial semitransparent layers is less than the number of outgoing light beams.

8. A beam splitter as claimed in claim 1 wherein said first outgoing light beam from said second partial semi-transparent layer has a higher intensity than the subsequent outgoing light beam from said second partial semi-transparent layer.

9. A beam splitter as claimed in claim 1 comprising at least one further partial semi-transparent layer on said preselected planar surface successively following said second partial semi-transparent layer, the number of partial semi-transparent layers being less than the number of outgoing light beams.

10. A beam splitter as claimed in claim 9 wherein at least some of said partial semi-transparent layers have different widths.

11. A beam splitter as claimed in claim 1 wherein for an intensity I of the incident light beam, an ideal intensity of each outgoing light beam is $(I/n)$ where n is equal to the number of outgoing light beams, the actual intensity of each outgoing light beam being at least 50% of the ideal intensity.

* * * * *